Dec. 14, 1965 R. J. MOLNAR ETAL 3,223,848

QUADRATURE REJECTION CIRCUIT

Filed April 5, 1961 2 Sheets-Sheet 1

INVENTORS
ROBERT J. MOLNAR
WALTER PARFOMAK

BY Marvin Snyder
AGENT

QUADRATURE REJECTION CIRCUIT

Filed April 5, 1961 2 Sheets-Sheet 2

INVENTORS
ROBERT J. MOLNAR
WALTER PARFOMAK

United States Patent Office 3,223,848

Patented Dec. 14, 1965

3,223,848
QUADRATURE REJECTION CIRCUIT

Robert J. Molnar, New York, and Walter Parfomak, Brooklyn, N.Y., assignors to The Bendix Corporation, Teterboro, N.J., a corporation of Delaware Filed Apr. 5, 1961, Ser. No. 100,950
15 Claims. (Cl. 307—88.5)

Figure 1:
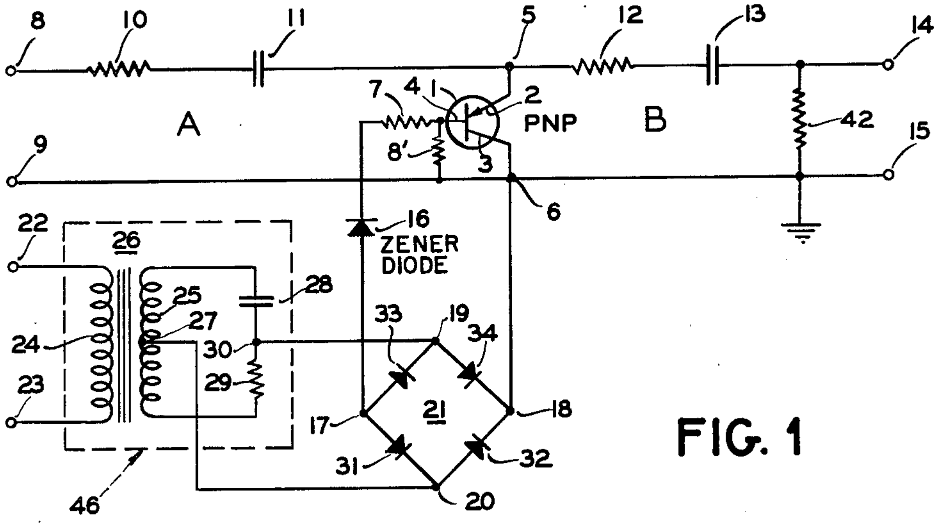

This invention relates to discriminators, and more particularly to discriminating means for passing signals of desired phase and rejecting signals which are 90° out of phase with the desired signal.

In most A.C. carrier servo systems, quadature signals, that is, signals which are 90° out of phase with the desired signal, represent an undesired noise signal which may saturate the servo amplifier, reduce the gain of the servo loop, and cause the servo motor to overheat. In order to eliminate defects such as these, quadrature rejection circuits which reduce the amplitude of the quadrature signal, are used.

In the past, quadrature rejection circuits have suffered from defects such as high nulls and poor frequency response. In addition, they have required complex circuitry, and have been of large size. Furthermore, they have required the use of matched circuit components, which creates the need for maintaining a constant ambient temperature so that the characteristics of the matched components will not become unmatched due to temperature changes during operation of the circuit. This arrangement also complicates servicing of the circuits by requiring replacement of the pair of matched components each time only one of the components becomes effective.

Accordingly, it is an object of this invention to provide a quadrature rejection circuit having a low null and excellent frequency response for suppressed carrier input.

Another object of this invention is to provide a quadrature rejection circuit having a controlled quadrature rejection ratio.

Another object of this invention is to provide a quadrature rejection circuit of simplified circuitry, small size, and light weight.

Another object of this invention is to provide a rugged quadrature rejection circuit of improved reliability.

Another object of this invention is to provide a quadrature rejection circuit in which matched components are not required.

Another object of this invention is to provide a quadrature rejection circuit in which use of modulators and demodulators is not required.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for the purpose of illustration and description only, and are not intended as a definition of the limits of the invention.

In the drawings:

FIGURE 1 is a schematic diagram of the basic embodiment of the quadrature rejection circuit.

FIGURES 2*a*, 2*b*, 2*c*, 2*d*, 2*e*, and 2*f* are waveforms to aid in explaining the operation of the circuit shown in FIGURE 1.

Figure 3:
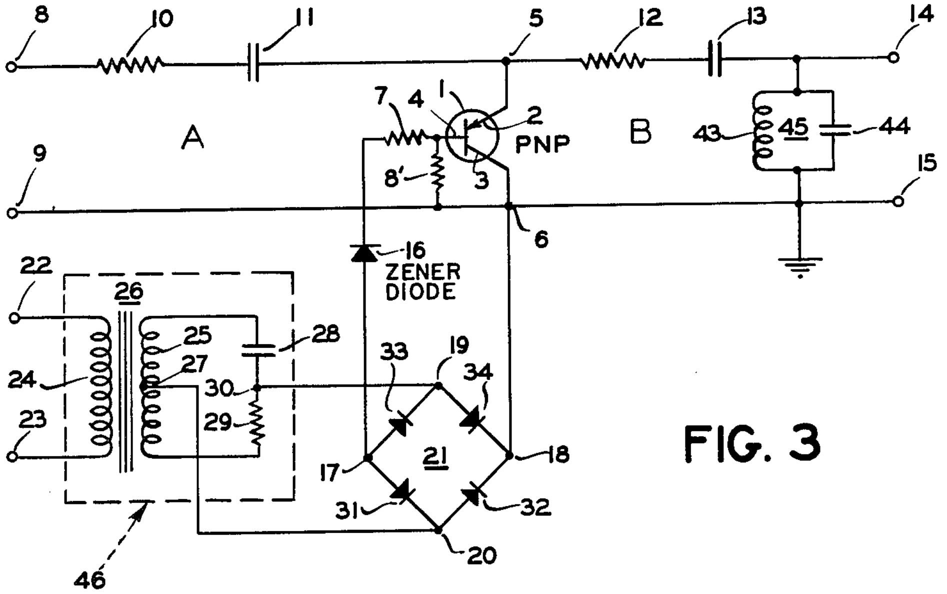

FIGURE 3 is a modification of the circuit shown in FIGURE 1.

Referring now to FIGURE 1, a novel discriminator is shown therein as comprising an input circuit A connected to an output circuit B at junctions 5 and 6. An active electronic device such as a transistor 1 is connected between terminals 5 and 6 and provides a path across the input to short out the input signal during a portion of each cycle as described hereinafter. Junction 6 is maintained at a reference potential, or ground. Input circuit A has a pair of input terminals 8 and 9 for receiving signals. Input terminal 8 is connected to junction 5 through series-connected isolation resistor 10 and direct current blocking capacitor 11. Input terminal 9 is directly connected to junction 6.

Output circuit B has a pair of output terminals 14 and 15. Output terminal 14 is connected to junction 5 through series connected isolation resistor 12 an ddirect current blocking capacitor 13. Output terminal 15 is directly connected to junction 6, and load resistor 42 is connected across output terminals 14 and 15.

Emitter electrode 2 of transistor 1 is connected to junction 5 and collector electrode 3 is connected to junction 6. Base electrode 4, which acts as the control electrode of transistor 1, is connected to junction 6 through resistor 8'. Base electrode 4 also is connected through a resistor 7 and a device displaying a current avalanche characteristic upon application of a given voltage amplitude, shown as a zener diode 16, to the negative terminal 17 of a source of voltage in quadrature phase relation to the desired component of the input signal. The voltage source may comprise a full-wave rectifier 21 including diodes 31, 32, 33, 34, negative output terminal 17 and positive output terminal 18. Positive output terminal 18 is connected to junction 6. Resistor 8' decreases the switching impedance and reduces the recovery time of transistor 1 and reduces transient spikes in the output.

Figures 2A, 2B, 2C, 2D, 2E:
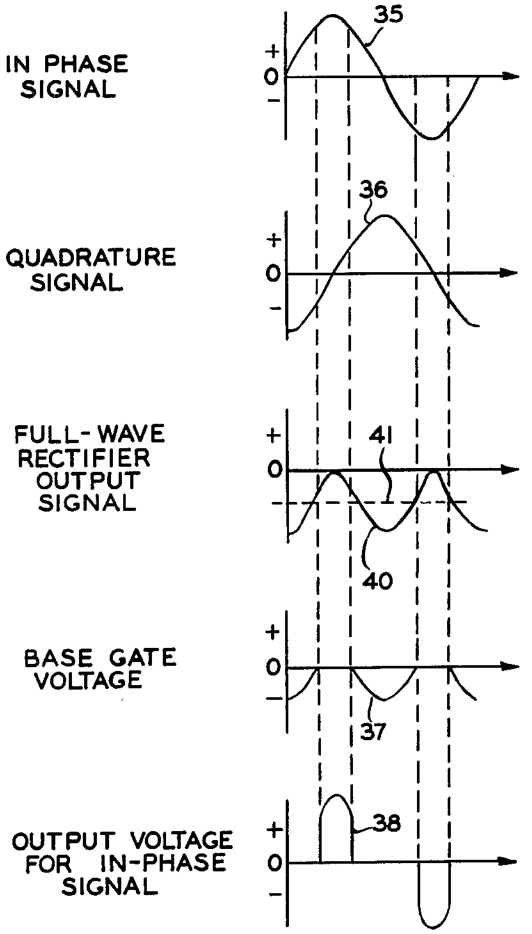

In operation transistor 1 functions as a gating means, or switch, which essentially short circuits the input signal to ground by providing a low impedance conduction path between junctions 5 and 6 so that substantially no signal appears across output terminals 14 and 15. This is referred to as the "off" condition of the transistor switch and occurs when the quadrature component is a maximum and the in-phase component is a minimum. When the in-phase component of the input signal 35, as shown in FIGURE 2*a*, passes through a positive maximum, and the quadrature component 36 of the input signal, as shown in FIGURE 2*b*, passes through zero, the gate voltage 37, as shown in FIGURE 2*d*, applied to the base 4 of transistor 1 is substantially zero. This causes transistor 1 to switch to its low current state, that is, it provides a high impedance path between junctions 5 and 6 so that the input signal passes through resistor 12 and capacitor 13 and appears across output terminals 14 and 15. This is referred to as the "on" condition of the transistor switch. Likewise, when the in-phase component of the input signal 35, as shown in FIGURE 2*a*, passes through a negative maximum, and the quadrature component 36 of the input signal, as shown in FIGURE 2*b*, passes through zero, the gate voltage 37, as shown in FIGURE 2*d*, is again substantially zero, so that transistor 1 switches to its low current state and causes the input signal to pass through resistor 12 and capacitor 13 and appear across output terminals 14 and 15. Thus, for each cycle of input signal having both in-phase and quadrature components, the output signal waveform 38 is substantially as shown in FIGURE 2*e*, and in-phase with the desired component of the input signal.

Figure 2F:
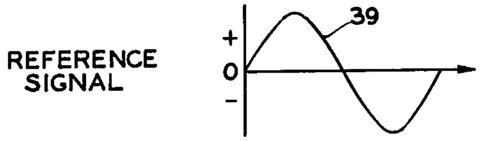

The reference signal 39, as shown in FIGURE 2*f* and applied to terminals 22 and 23, is in-phase with the desired component of the input signal 35. Transformer 26, capacitor 28, and resistor 29 form a phase-shifting circuit 46 as is well known in the art, so that the voltage applied across rectifier input terminals 19 and 20 is 90° out of phase with the desired component of the input voltage. This voltage then undergoes full-wave rectification in rectifier 21, so that a series of negative pulses 40, as shown in FIGURE 2*c*, is applied to zener diode 16 in the reverse-bias direction. Zener breakdown of zener diode 16 occurs when the amplitude of the reverse voltage across this diode exceeds its zener breakdown potential, which is represented by voltage level 41 in FIGURE 2*c*. When zener breakdown occurs, a reverse current flows through zener diode 16, which must of necessity flow through the base 4 of transistor 1. This flow of base current from transistor 1 keeps the transistor in its high current low impedance state, and at this time, no signal appears at output terminals 14 and 15, as previously explained. However, when the amplitude of the negative pulses 40 of FIGURE 2*c* decreases to a value less than that of the zener breakdown voltage of zener diode 16, the flow of base current from transistor 1 ceases, and the transistor switches to its low current high impedance state, permitting the current produced by the input signal to flow through the circuit to output terminals 14 and 15, as previously explained. When the amplitude of the negative pulses 40 of FIGURE 2*c* again increases to a value greater than that of the zener diode breakdown voltage 41 of FIGURE 2*c*, the flow of base current from transistor 1 resumes, the transistor switches to its high current low impedance state, and no signal appears at output terminals 14 and 15, as previously explained. It is apparent, therefore, that the circuit comprising phase-shifting circuit 46, full wave rectifier 21, and zener diode 16 form the means for controlling the operation of the gating means, shown as transistor 1.

It can be seen from FIGURE 2*c* that if the zener diode breakdown voltage 41 were of lesser or greater amplitude than indicated, the gate voltage 37 of FIGURE 2*d* would be zero for a lesser or greater portion of the cycle, respectively, keeping the transistor switch "on" for a lesser or greater portion of the cycle, respectively. Since the amplitudes of the zener breakdown voltage vary with different types of zener diodes, by use of different types of zener diodes 16 in the circuit the length of time that the transistor switch is kept "on" during each cycle can be accurately controlled. This in turn permits accurate control of the amount of quadrature signal 36 of FIGURE 2*b* which appears in the output voltage 38 of FIGURE 2*e*. The longer the transistor switch is kept "on," the greater will be the amount of quadrature signal in the output voltage. Thus, by control of the zener diode breakdown voltage through use of different types of zener diodes 16, the quadrature rejection ratio, herein defined as the ratio of the amplitude of the in-phase signal to the amplitude of the quadrature signal in the output voltage of the circuit, can be accurately controlled.

Referring now to FIGURE 3, a modification of the output circuit of FIGURE 1 is shown, wherein a sinusoidal output waveform may be obtained through use of a tank circuit 45 comprising inductance 43 and capacitance 44 connected in place of resistor 42 of FIGURE 1. The values of inductance 43 and capacitance 44 are adjusted so as to tune the tank circuit 45 to the frequency of the input signal. The sinusoidal waveform is produced by the pulsating excitation of tank circuit 45 in a manner well known in the art. The circuit of FIGURE 3 in all other respects is similar to the circuit of FIGURE 1, and operates in the same manner.

Although only two embodiments of the invention have been illustrated and described in detail, it is expressly understood that invention is not limited thereto. Various changes can be made in the design and arrangement of the parts without departing from the spirit and scope of the invention as will now be understood by those skilled in the art.

What is claimed is:

1. A phase discriminator for passing desired in-phase signals and discriminating against undesired quadrature signals, comprising an input circuit, an output circuit connected to said input circuit, and a transistor having its emitter and collector connected across the input circuit for providing a path across the input circuit, control means for changing the impedance of said path by providing a high impedance when the quadrature signal amplitude is a minimum and the in-phase signal amplitude is a maximum to prevent passage of any portion of the signal therethrough and a low impedance when the quadrature signal amplitude is a maximum and the in-phase signal amplitude is a minimum to prevent any portion of the signal from passing to the output.

2. A phase discriminator for passing desired in-phase signals and discriminating against undesired quadrature signals, comprising an input circuit, an output circuit connected to said input circuit, and means for providing a path across the input circuit including a transistor, and means for changing the impedance of the transistor including means connected to said transistor for switching said transistor from its low impedance state to its low current high impedance state when the in-phase component of the input signal substantially reaches maximum amplitude and the quadrature component of the input signal substantially reaches minimum amplitude to prevent passage therethrough of the signal, and for switching said transistor to its high current low impedance state after the in-phase component of the input signal has fallen below its maximum amplitude and the quadrature component of the input signal has increased in amplitude from its minimum value to prevent any portion of the signal from passing to the output.

3. A phase discriminator for passing desired in-phase signals and discriminating against undesired quadrature signals comprising an input circuit, an output circuit connected to said input circuit, a path across the input circuit including a transistor, means for changing the impedance of the transistor including a device displaying a current avalanche characteristic upon application of a predetermined voltage amplitude to provide a high impedance path when the in-phase component is a maximum and the quadrature component is a minimum and a low impedance path when the in-phase component is a minimum and the quadrature component is a maximum.

4. The phase discriminator defined in claim 3 wherein said device displaying a current avalanche characteristic upon application of a predetermined voltage amplitude comprises a zener diode.

5. A phase discriminator for passing desired in-phase signals and discriminating against undesired quadrature signals comprising an input circuit, an output circuit connected to said input circuit at two junctions, a transistor having three electrodes, one of said electrodes being connected to one of said junctions, the second electrode being connected to the other of said junctions, and control means connected to the third electrode for raising the impedance of said transistor each time the quadrature signal amplitude substantially reaches a minimum and the in-phase signal substantially reaches a maximum, and for lowering the impedance of said transistor each time the quadrature signal amplitude increases from its minimum value and the in-phase signal amplitude decreases from its maximum value.

6. The phase discriminator defined in claim 5 wherein said control means comprises a phase-shifting circuit and a rectifier energized from a source of reference voltage in phase with the in-phase component.

7. The phase discriminator defined in claim 5 wherein said control means comprises a phase-shifting circuit, a rectifier, and a device displaying a current avalanche characteristic upon application of a given amplitude of voltage, and the control means is energized from a source of reference voltage in phase with the in-phase component.

8. The phase discriminator defined in claim 7 wherein said device displaying a current avalanche characteristic upon application of a given amplitude of voltage comprises a zener diode.

9. A phase discriminator for passing desired in-phase signals and discriminating against undesired quadrature signals comprising an input circuit, an output circuit connected to said input circuit at two junctions, one of said junctions being a point of reference potential, a transistor having a collector, an emitter, and a base, said collector being connected to said point of reference potential, said emitter being connected to the other of said junctions, and control means connected to the base for changing the impedance of said transistor to provide a high impedance when the quadrature signal is a minimum and the in-phase signal is a maximum and a low impedance when the quadrature signal is a maximum and the in-phase signal is a minimum.

10. The phase discriminator defined in claim 9 wherein said control means comprises a phase-shifting circuit and a rectifier energized from a source of reference voltage in phase with the in-phase component.

11. The phase discriminator defined in claim 9 wherein said control means comprises a phase-shifting circuit, a rectifier, and a device displaying a current avalanche characteristic upon application of a given voltage amplitude and the control means is energized from a source of reference voltage in phase with the in-phase component.

12. The phase discriminator defined in claim 9 wherein a resistor is connected between the base and common for decreasing switching impedance and reducing the recovery time of the transistor and reducing transient spikes.

13. A quadrature rejection circuit for discriminating against undesired quadrature signals comprising an input circuit, an output circuit having a pair of output terminals and connected to the input circuit at two junctions, one of said junctions being a point of reference potential, a load impedance connected across said pair of output terminals, a transistor having a collector electrode, an emitter electrode, and a base electrode, said collector electrode being connected to said point of reference potential and said emitter electrode being connected to the other of said junctions, and control means for said transistor comprising a full wave rectifier having a pair of input terminals, a positive output terminal, and a negative output terminal, a base resistor, and a zener diode, a phase-shifting circuit connected to the pair of input terminals of said full wave rectifier, said positive output terminal of said full wave rectifier being connected to said point of reference potential, one side of said base resistor being connected to the base electrode of said transistor, and said zener diode being connected in the reverse-bias direction between the other side of said base resistor and said negative output terminal of said full wave rectifier for switching said transistor from its high current low impedance state when the in-phase component of the input signal substantially reaches maximum amplitude and the quadrature component of the input signal substantially reaches minimum amplitude, and for switching said transistor back to its high current low impedance state after the in-phase component of the input signal has fallen below its maximum amplitude and the quadrature component of the input signal has increased in amplitude from its minimum value.

14. The quadrature rejection circuit defined in claim 13 wherein said input and output circuits each comprise a series connected isolation resistor and blocking capacitor.

15. A quadrature rejection circuit for discriminating against undesired quadrature signals comprising an input circuit, an output circuit having a pair of output terminals and connected to said input circuit at two junctions, one of said junctions being a point of reference potential; a transistor having a collector electrode, an emitter electrode, and a base electrode, said collector electrode being connected to said point of reference potential and said emitter electrode being connected to the other of said junctions, a tank circuit including an inductor and capacitor connected in parallel across said pair of output terminals, and control means for said transistor comprising a 90° phase-shifting circuit having a pair of input terminals for application of a reference signal in quadrature with said undesired quadrature signals, a full wave rectifier having a pair of input terminals and positive and negative output terminals, a base resistor, and a zener diode, said phase-shifting circuit being connected to the pair of input terminals of said full wave rectifier, said positive output terminal of said full wave rectifier being connected to said point of reference potential, one side of said base resistor being connected to the base electrode of said transistor, and said zener diode being connected in the reverse-bias direction between the other side of said base resistor and said negative output terminal of said full wave rectifier for switching said transistor from its high current low impedance state when the in-phase component of the input signal substantially reaches maximum amplitude and the quadrature component of the input signal substantially reaches minimum amplitude, and for switching said transistor back to its high current low impedance state after the in-phase component of the input signal has fallen below its maximum amplitude and the quadrature component of the input signal has increased in amplitude from its minimum value.

References Cited by the Examiner

UNITED STATES PATENTS

| | | | |
|---|---|---|---|
| 2,833,918 | 5/1958 | Knox | 328—166 |
| 2,864,950 | 12/1958 | Pernick | 328—166 X |
| 2,945,950 | 7/1960 | Midkiff | 307—88.5 |
| 2,965,771 | 12/1960 | Finkel | 307—88.5 |
| 2,982,868 | 5/1961 | Emile | 307—88.5 |
| 3,008,076 | 11/1961 | MacDonald | 307—88.5 |
| 3,011,117 | 11/1961 | Ford | 307—88.5 |
| 3,025,418 | 3/1962 | Brahm | 328—166 X |
| 3,030,522 | 4/1962 | Fennick | 328—166 X |
| 3,045,156 | 7/1962 | Losher | 328—166 X |
| 3,065,361 | 11/1962 | Brook | 328—166 X |
| 3,085,166 | 4/1963 | Gogia et al. | 328—166 X |
| 3,094,608 | 6/1963 | Archer | 328—166 X |
| 3,109,939 | 11/1963 | Chin et al. | 328—166 X |

ARTHUR GAUSS, *Primary Examiner.*

HERMAN KARL SAALBACH, JOHN W. HUCKERT, *Examiners.*